(12) United States Patent
Chen et al.

(10) Patent No.: US 10,079,437 B2
(45) Date of Patent: Sep. 18, 2018

(54) DISTRIBUTED ANTENNA ARRAY

(71) Applicant: The United States of America, as represented by the Secretary of the Army, Washington, DC (US)

(72) Inventors: Shuguang Chen, Ellicott City, MD (US); Mahmoud Khalil, Lincroft, NJ (US); Timothy Bocskor, Baltimore, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 411 days.

(21) Appl. No.: 14/867,473

(22) Filed: Sep. 28, 2015

(65) Prior Publication Data

US 2017/0093048 A1 Mar. 30, 2017

(51) Int. Cl.
*H01Q 21/24* (2006.01)
*H04B 7/10* (2017.01)
*H01Q 21/08* (2006.01)
*H01Q 21/28* (2006.01)
*H01Q 25/00* (2006.01)
*H04B 10/532* (2013.01)
*H01Q 1/52* (2006.01)
*H01Q 3/30* (2006.01)

(52) U.S. Cl.
CPC ............ *H01Q 21/24* (2013.01); *H01Q 21/08* (2013.01); *H01Q 21/28* (2013.01); *H04B 7/10* (2013.01); *H01Q 1/523* (2013.01); *H01Q 3/30* (2013.01); *H01Q 21/245* (2013.01); *H01Q 25/001* (2013.01); *H04B 10/532* (2013.01)

(58) Field of Classification Search
CPC .... H01Q 21/245; H01Q 21/24; H01Q 25/001; H04B 7/10; H04B 10/532
USPC .................................................. 342/363, 365
See application file for complete search history.

(56) References Cited

U.S. PATENT DOCUMENTS

| | | | |
|---|---|---|---|
| 5,099,254 A | 3/1992 | Tsukii et al. | |
| 5,583,515 A | 12/1996 | Marumoto | |
| 6,067,053 A * | 5/2000 | Runyon | H01Q 1/246 343/700 MS |
| 6,205,337 B1 | 3/2001 | Boch | |
| 6,771,218 B1 * | 8/2004 | Lalezari | G01S 13/48 342/373 |
| 6,777,684 B1 | 8/2004 | Volkov et al. | |
| 6,823,177 B1 * | 11/2004 | Lucidarme | H04B 7/10 343/797 |
| 6,914,553 B1 | 7/2005 | Beadle et al. | |
| 7,839,351 B2 * | 11/2010 | Schadler | H01Q 1/246 343/742 |
| 8,466,838 B2 * | 6/2013 | Adada | H01Q 1/38 343/700 MS |
| 8,860,416 B2 | 10/2014 | Bittar et al. | |

(Continued)

*Primary Examiner* — Chuong P Nguyen
(74) *Attorney, Agent, or Firm* — Ronald Krosky; Azza Jayaprakash

(57) ABSTRACT

Various embodiments are described that relate to co-polarization between a first antenna and a second antenna. The first antenna and second antenna can be configured such that co-polarization between the two is increased (e.g., maximized) while cross-polarization is decreased (e.g., minimized). This can be accomplished by physical orientation of the first antenna against the second antenna and/or through powering the first antenna and second antenna differently with phase delay.

20 Claims, 15 Drawing Sheets

(56) References Cited

U.S. PATENT DOCUMENTS

| | | | |
|---|---|---|---|
| 8,988,302 B2* | 3/2015 | Petersson | H01Q 21/24 343/756 |
| 9,070,971 B2* | 6/2015 | Johnston | H01Q 9/16 |
| 9,559,763 B2* | 1/2017 | Asplund | |
| 2003/0052834 A1* | 3/2003 | Sievenpiper | H01Q 21/245 343/909 |
| 2003/0142027 A1 | 7/2003 | Moheb | |
| 2005/0128137 A1 | 6/2005 | Lee et al. | |
| 2008/0055188 A1 | 3/2008 | Lynch | |
| 2010/0079328 A1 | 4/2010 | Drake et al. | |
| 2012/0026032 A1 | 2/2012 | Sigmund | |
| 2013/0006585 A1 | 1/2013 | Simon | |
| 2013/0027259 A1 | 1/2013 | Fujita et al. | |
| 2013/0115886 A1* | 5/2013 | Khan | H01Q 3/26 455/42 |
| 2013/0157601 A1 | 6/2013 | O'Keeffee et al. | |
| 2013/0182750 A1 | 7/2013 | Zhang et al. | |
| 2013/0328721 A1 | 12/2013 | Rochblatt | |
| 2014/0159937 A1 | 6/2014 | Beadle et al. | |
| 2014/0192918 A1 | 7/2014 | Park et al. | |
| 2014/0347210 A1 | 11/2014 | Sgarz et al. | |
| 2015/0215104 A1 | 6/2015 | Ma et al. | |
| 2015/0214633 A1* | 7/2015 | Pan | H01Q 1/20 342/372 |
| 2015/0222025 A1* | 8/2015 | Song | H01Q 21/24 343/798 |

* cited by examiner

DISTRIBUTED ANTENNA ARRAY

GOVERNMENT INTEREST

The innovation described herein may be manufactured, used, imported, sold, and licensed by or for the Government of the United States of America without the payment of any royalty thereon or therefor.

BACKGROUND

An antenna can be used as part of a communication network. Signals can be wirelessly transmitted from one antenna to another with both antennas being associated with the communication network. These signals can transmit various types of information, such as voice or data, from one antenna to another. Transmitting signals between one another is an example of two antennas working together. Antennas working together can be beneficial to achieving a goal of the communication network.

SUMMARY

In one embodiment, a system comprises a first antenna element and a second antenna element. The first antenna element and the second antenna element experience a co-polarization along a first electromagnetic directional axis and experience a cross-polarization along a second electromagnetic directional axis. The first electromagnetic directional axis is orthogonal to the second electromagnetic directional axis.

In another embodiment, a system comprises a first antenna element and a second antenna element. The first antenna element, when powered, produces a first electromagnetic vector in a first direction and produces a first electromagnetic vector in a first orthogonal direction. The second antenna element, when powered, produces a second electromagnetic vector in the first direction and produces a second electromagnetic vector in a second orthogonal direction. The first orthogonal direction and the second orthogonal direction are opposite one another, the first orthogonal direction is orthogonal to the first direction, and the second orthogonal direction is orthogonal to the first direction.

In yet another embodiment, a method comprises supplying a power with a first phase to a first antenna and a power with a second phase to a second antenna with the supplying being by way of a power supply component that is, at least in part, hardware. The first antenna and the second antenna can be part of an antenna array while the second phase can be delayed with a phase delay from the first phase. In response to being supplied with the power with the first phase, the first antenna emits a first electromagnetic vector with component vectors in a first direction and a first orthogonal direction. Similarly, in response to being supplied with the power with the second phase, the second antenna emits a second electromagnetic vector with component vectors in the first direction and a second orthogonal direction. The first orthogonal direction and the second orthogonal direction are opposite directions such that they, at least in part, cancel one another. Meanwhile, the first electromagnetic component vector in the first direction and the second electromagnetic component vector in the first direction amplify magnitude in the first direction.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
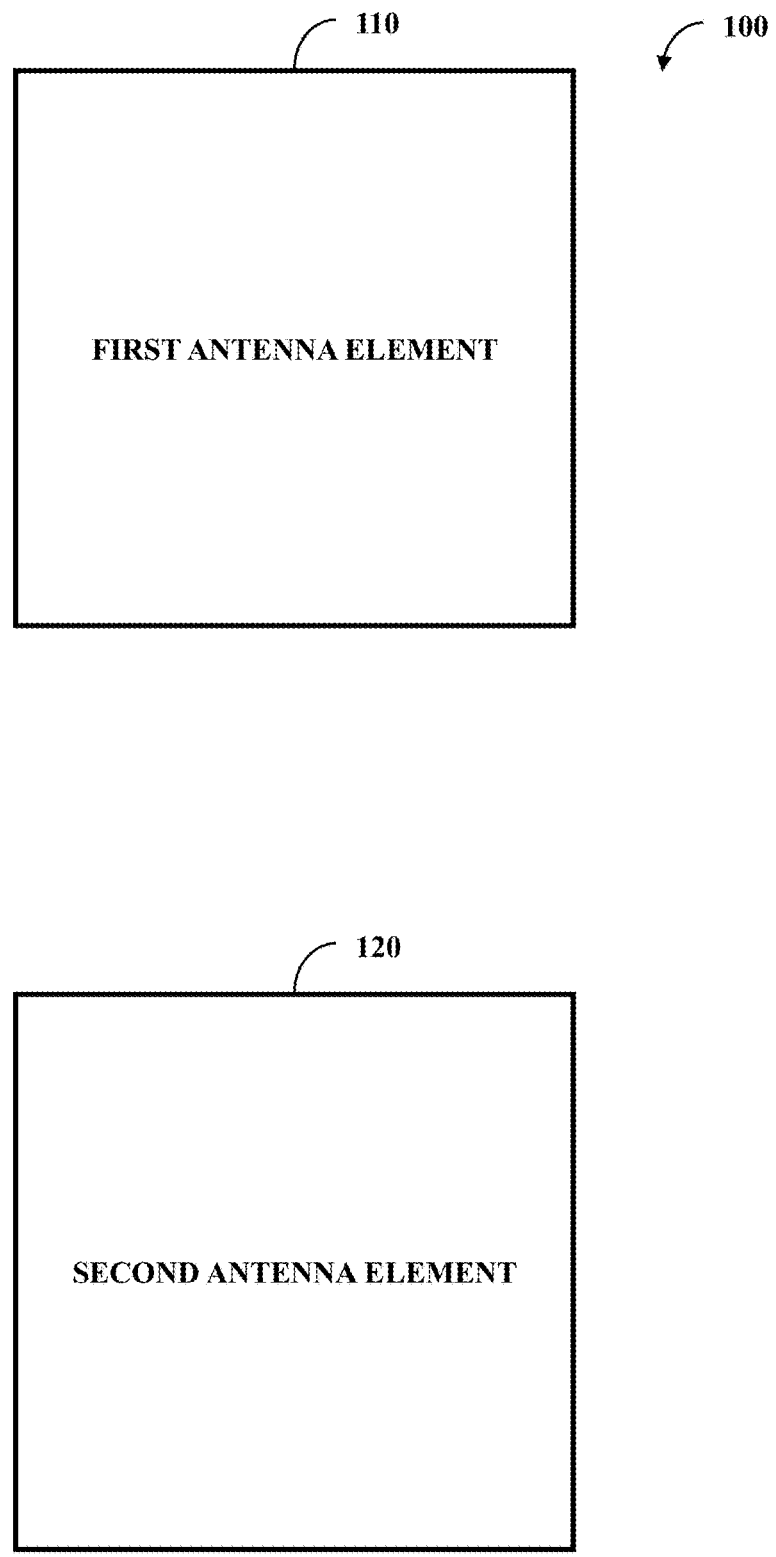
FIG. 1 illustrates one embodiment of a system comprising a first antenna and a second antenna.

An antenna array can comprise multiple antennas and use these antennas to achieve superior performance over a single antenna. When an antenna is powered, the antenna can produce an electromagnetic field. This electromagnetic field can be represented as a vector with a direction and amplitude. Further, this vector can be broken down into two component vectors—a vertical vector and a horizontal vector. Oftentimes one of the two component vectors is stronger than the other. The stronger vector can be desirable while the weaker vector is less desirable. Therefore, ideally the stronger vector can be a strong as possible while the weaker vector is as small as possible (e.g., as close to zero as possible).

In one embodiment, individual antennas of the antenna array can be physically positioned against one another to cause as close to the ideal effect as possible. In one embodiment, individual antennas of the antenna array can be powered in a manner as to cause as close to the ideal effect as possible. Using either or both of these embodiments, the stronger component vectors can line up together such that their sum increases the overall amplitude. Similarly, the weaker component vectors can line up together to cancel one another out. Therefore, as close as possible to the ideal effect can be realized.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a first antenna element 110 and a second antenna element 120. The first antenna element 110 and the second antenna element 120 form an antenna array (e.g., an antenna array that is also a sub-array of a larger array). While two antenna elements are illustrated, more complex implementations can be used (e.g., four antennas).

Figure 2A:
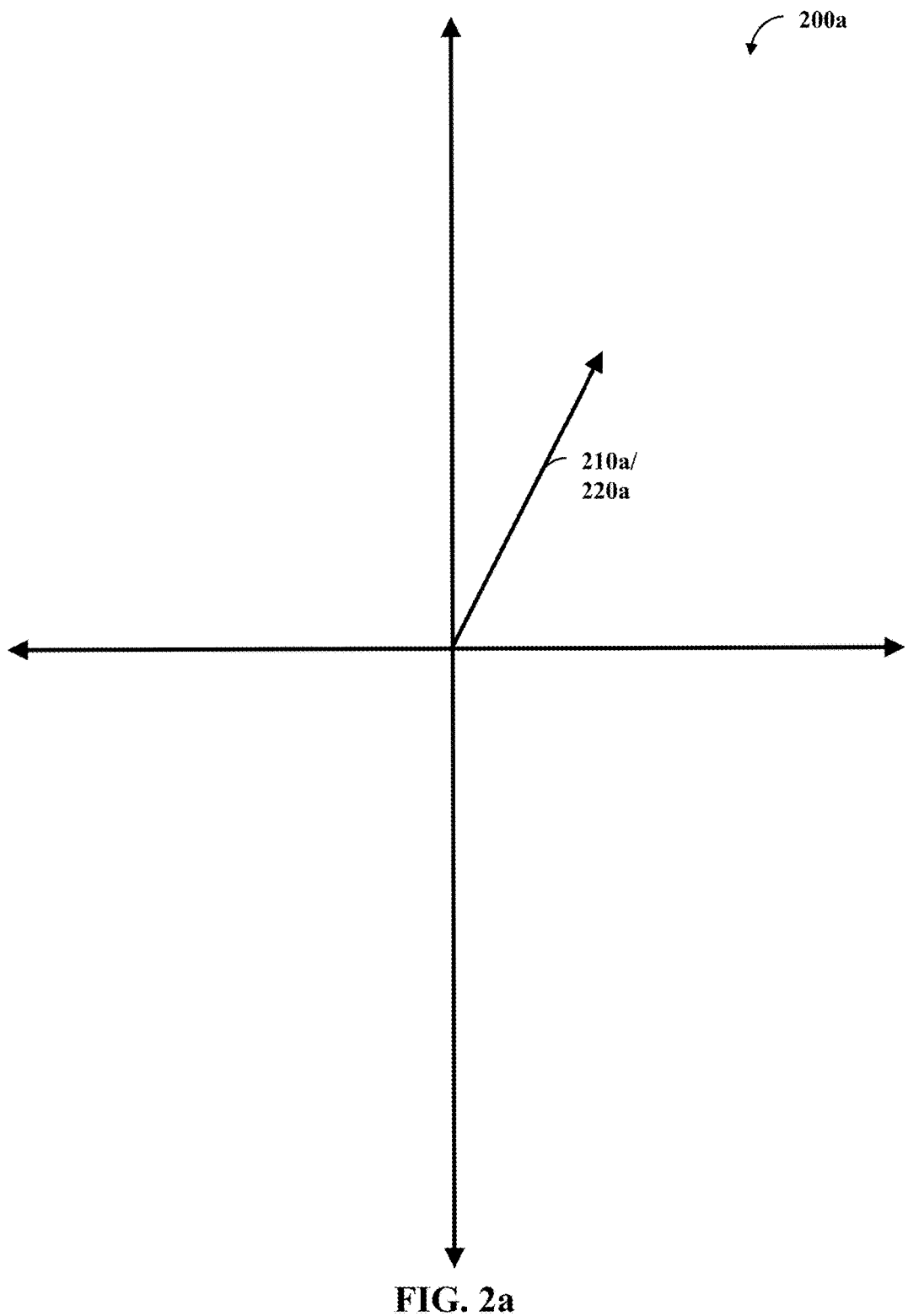
FIGS. 2a-2c illustrate one embodiment of three graphs.
Figure 2B:
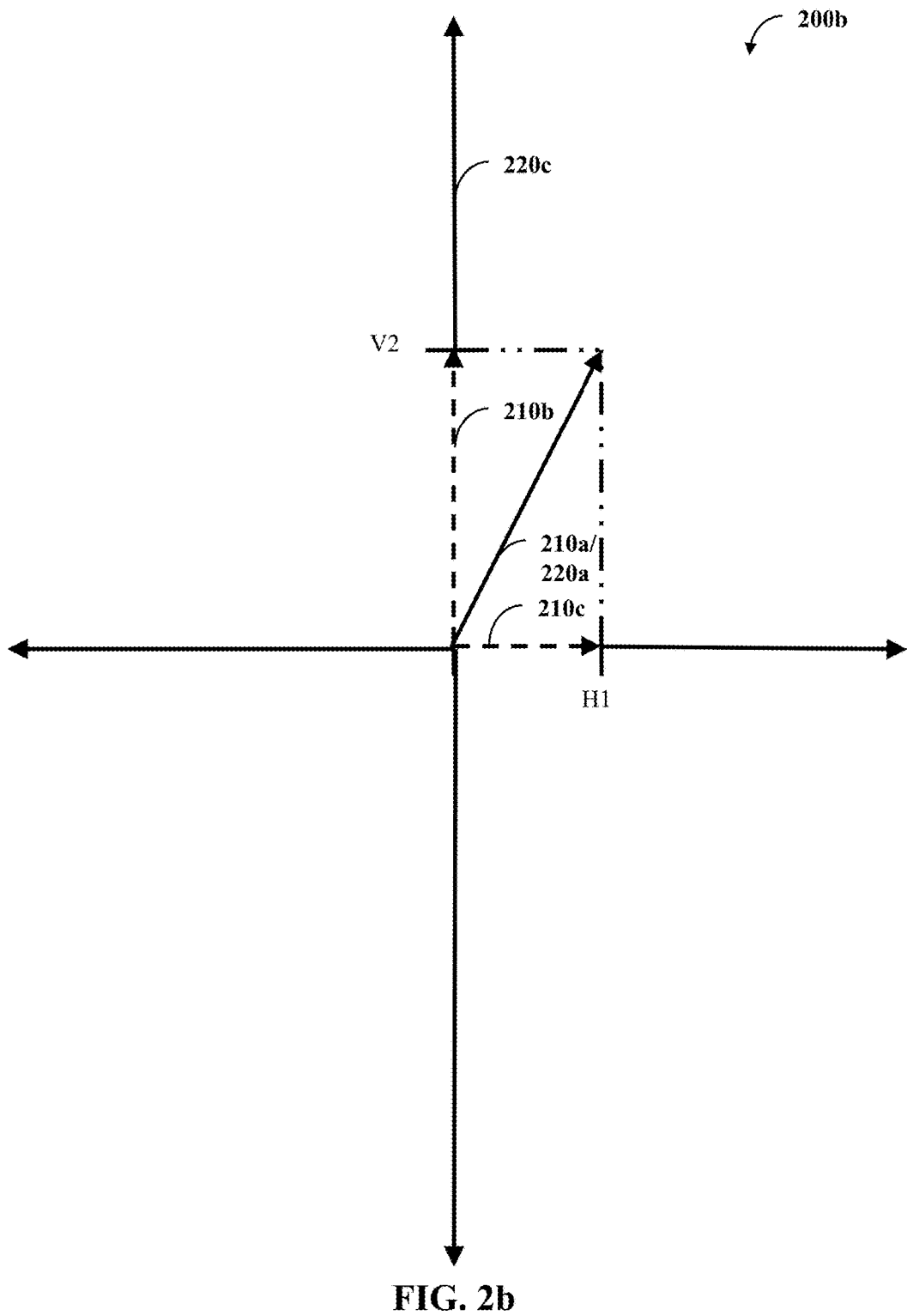
Figure 2C:
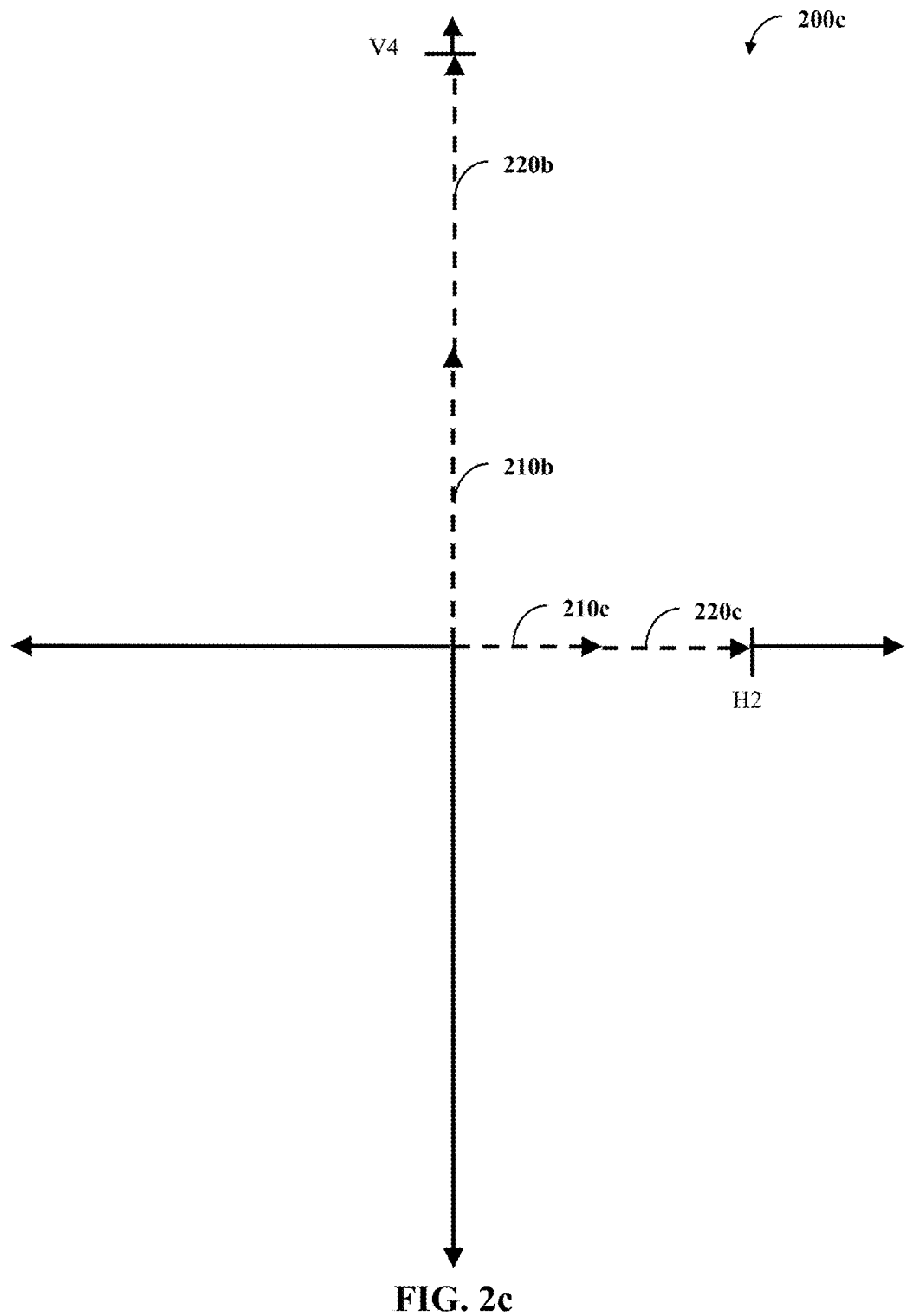

FIGS. 2a-2c illustrate one embodiment of three graphs 200a-200c. The graph 200a illustrates a complex vector 210a that can be produced by the first antenna element 110 of FIG. 1 when the first antenna element 110 of FIG. 1 is in a first position. Similarly, a complex vector 220a can be produced by the second antenna element 120 of FIG. 1 when in the first position. The complex vector 210a and the complex vector 220a can be identical to one another.

The graph 200b illustrates how the complex vector 210a can be broken down into two component vectors. The first component vector can be a vertical vector 210b at a value of V2 and the second component vector can be a horizontal vector 210c at a value of H1. The strength of the vertical vector 210b is twice as strong as the strength of the horizontal vector 210c. The dotted and dashed combo lines illustrate how the horizontal and vertical component vectors line up with the complex vector.

The graph 200c illustrates how these component vectors can line up together. The two vertical vectors 210b and 220b can combine together for a strength of V4. However, the horizontal vectors 210c and 220c can line up to a strength of H2. As discussed above, it can be desirable for the weaker vectors to be as low as possible.

Figure 3A:
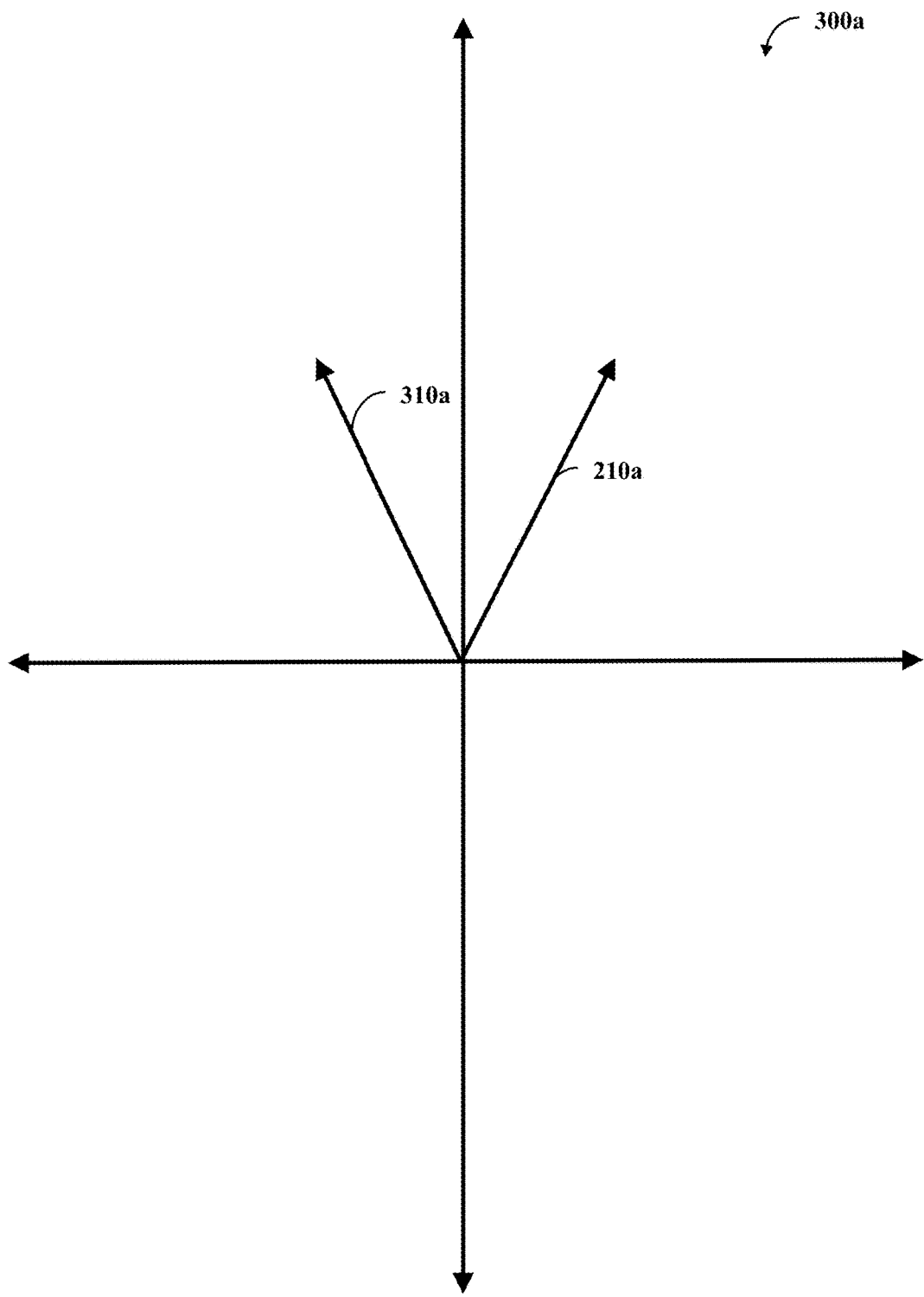
FIGS. 3a-3b illustrate one embodiment of two graphs.
Figure 3B:
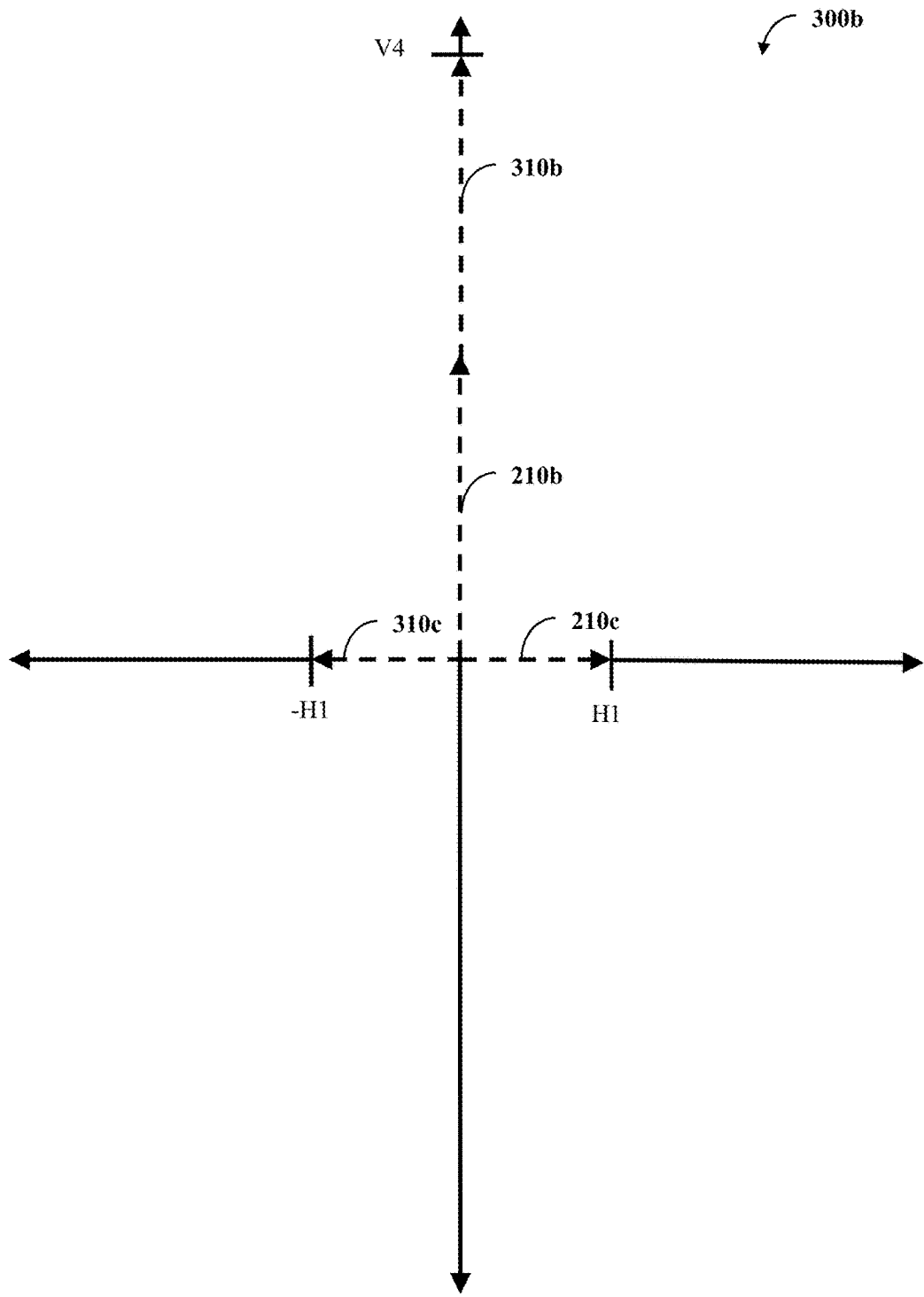

FIGS. 3a-3b illustrate one embodiment of two graphs 300a-300b. The graph 300a can show the complex vector 210a in the same position as in the graph 200a of FIG. 2a. However, instead of producing the complex vector 220a of FIG. 2a, the vector 310a can be produced.

The graph 300b illustrates the complex vector 310a as two component vectors—vertical vector 310b and horizontal vector 310c while the vector 210a is also illustrated as the vertical vector 210b and the horizontal vector 210c. As with the graph 200c of FIG. 2c, the two vertical component vectors 210b and 310b combine together to for a strength of V4. However, as opposed to the graph 200c of FIG. 2c, the two horizontal vectors 210c and 310c combine not to a strength of H2, but instead to H0. This is because the horizontal vector 310c has a value of −H1 while the horizontal vector 210c has a value of H1. When these are combined they cancel one another out to a value of H0. H0 can be considered having no strength.

This illustrates an idealized situation for the first antenna element 110 of FIG. 1 and the second antenna element 120 of FIG. 1. In an actual implementation, the value may not be exactly zero (represented as H0), but instead be near zero. The combined vertical vectors 210b and 310b can be considered an example of co-polarization such that the first antenna element 110 of FIG. 1 and the second antenna element 120 of FIG. 1 experience co-polarization along a first electromagnetic directional axis (here the vertical axis). Similarly, the combined horizontal vectors 210c and 310c can be considered cross-polarization such that the first antenna element 110 of FIG. 1 and the second antenna element 120 of FIG. 1 experience cross-polarization along a second electromagnetic directional axis (here the horizontal axis). As can be seen, the first electromagnetic directional axis and the second electromagnetic directional axis can be orthogonal to one another.

In one embodiment, the first antenna element 110 of FIG. 1, when powered, can produce a first electromagnetic vector in a first direction (e.g., vector 210b) and can produce a first electromagnetic vector in a first orthogonal direction (e.g., vector 210c). Similarly, the second antenna, when powered, can produce a second electromagnetic vector in the first direction (e.g., vector 310b) and a second electromagnetic vector in a second orthogonal direction (e.g., vector 310c). The first orthogonal direction and the second orthogonal direction are opposite one another, the first orthogonal direction is orthogonal to the first direction, and the second orthogonal direction is orthogonal to the first direction.

As shown in FIGS. 2c and 3b, the co-polarization axis (the axis with a higher combined amplitude) is the vertical axis while the cross-polarization axis (the axis with a lower combined amplitude) is the horizontal axis. However, this is merely given for example purposes and other implementations can be used such as the co-polarization occurring along the horizontal axis.

While horizontal and vertical arrangements are illustrated, other arrangements can be used. For example, the co-polarization can be right-hand circular polarization or left-hand circular polarization (e.g., both as circular co-polarization). Co-polarization can be an increase in radiation beam directivity for the system 100 of FIG. 1.

Figure 4:
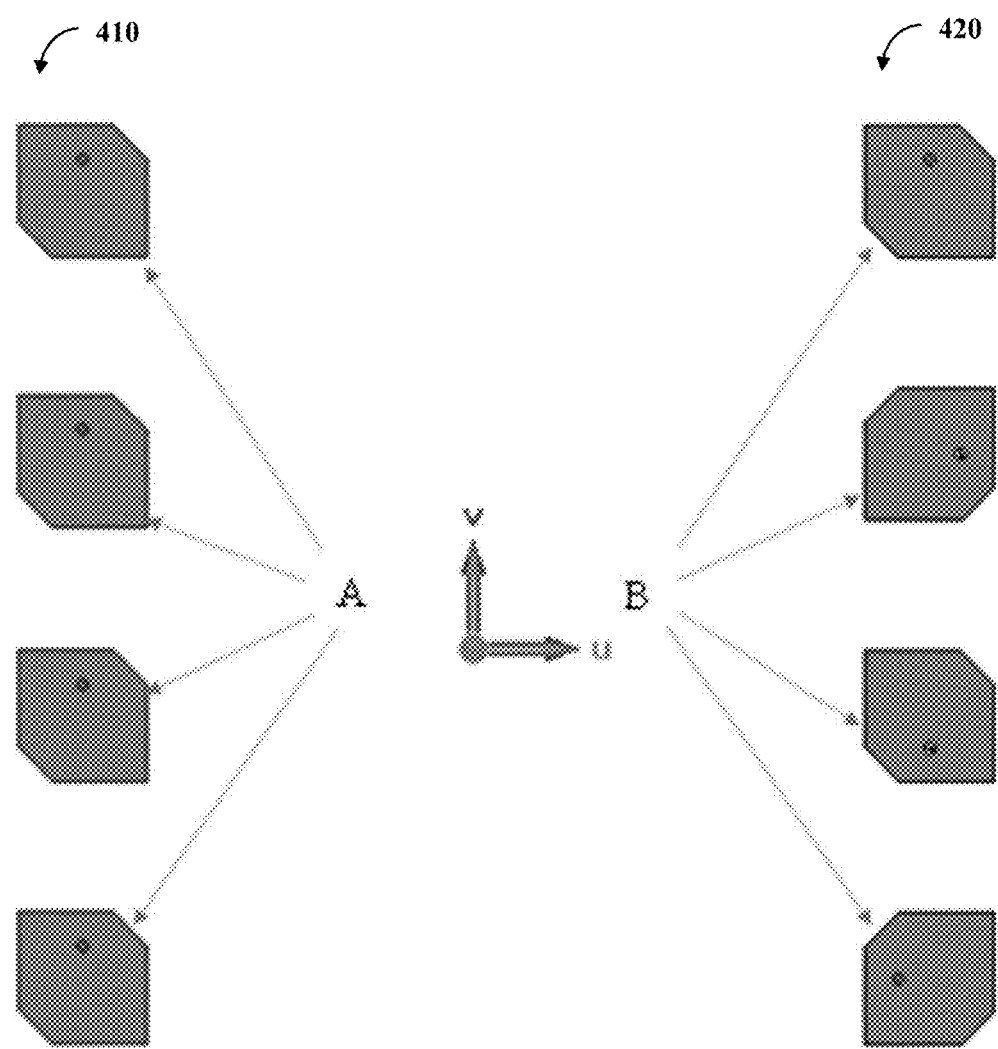
FIG. 4 illustrates one embodiment of two antenna arrays.

FIG. 4 illustrates one embodiment of two antenna arrays 410 and 420. The antenna arrays 410 and 420 are illustrated as how they physically arrange with one another along a two dimensional plane (vertical axis v and horizontal axis u). The antenna array 410 can produce four complex vectors (one for each antenna element that can include the first antenna element 110 of FIG. 1 and the second antenna element 120 of FIG. 1) similar to vectors 210a and 220a in FIG. 2a. These four complex vectors can be identical to one another. As illustrated in FIG. 2c, the identical vectors can create desirable high co-polarization, but undesirable cross-polarization as well. One manner in which to lower the cross-polarization while retaining the higher co-polarization is through physical manipulation. With this, the antenna array 420 can have at least some of the individual antenna elements rotated (e.g., along x-axis, y-axis, and/or z-axis) such that co-polarization is increased while cross-polarization is decreased. An example rotation as shown with the antenna array 420 can be sequential rotation where the rotation among elements is equal to 90 degrees from one another (e.g., 0°, 90°, 180°, and 270°).

While the antenna arrays 410 and 420 are illustrated with four elements, an antenna array can be more or less than four elements. In one example, the first antenna element 110 of FIG. 1 and the second antenna element 120 of FIG. 1 can be physically orientated against one another to experience co-polarization along the first electromagnetic directional axis (e.g., vertical axis). Similarly, the first antenna element 110 of FIG. 1 and the second antenna element 120 of FIG. 1 can be physically orientated against one another to experience cross-polarization along the second electromagnetic directional axis.

Figure 5:
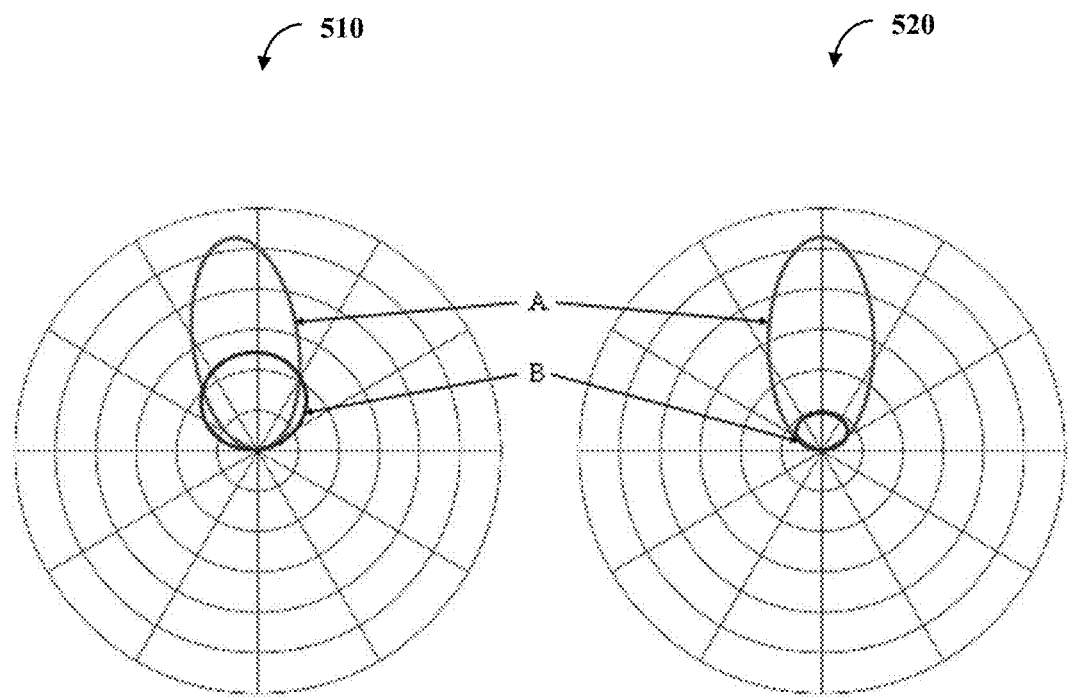
FIG. 5 illustrates one embodiment of two plots.

FIG. 5 illustrates one embodiment of two plots 510 and 520. The plots 510 and 520 can illustrate co-polarization (designated as A) and cross-polarization (designated as B). Plot 510 can be for the antenna array 410 of FIG. 4 where elements are aligned the same way. Plot 520 can be for antenna array 420 of FIG. 4 where elements are aligned against one another to improve performance.

As can be seen by comparing plot 510 against plot 520 at least two major impacts can be had by strategically aligning the elements as in the antenna array 420 of FIG. 4. One major impact is that the cross-polarization is smaller in the plot 520 than the plot 510. Another major impact is that the co-polarization is more centrally aligned in the plot 520 than the plot 510, with that alignment being able to be achieved down a bore site.

Figure 6:
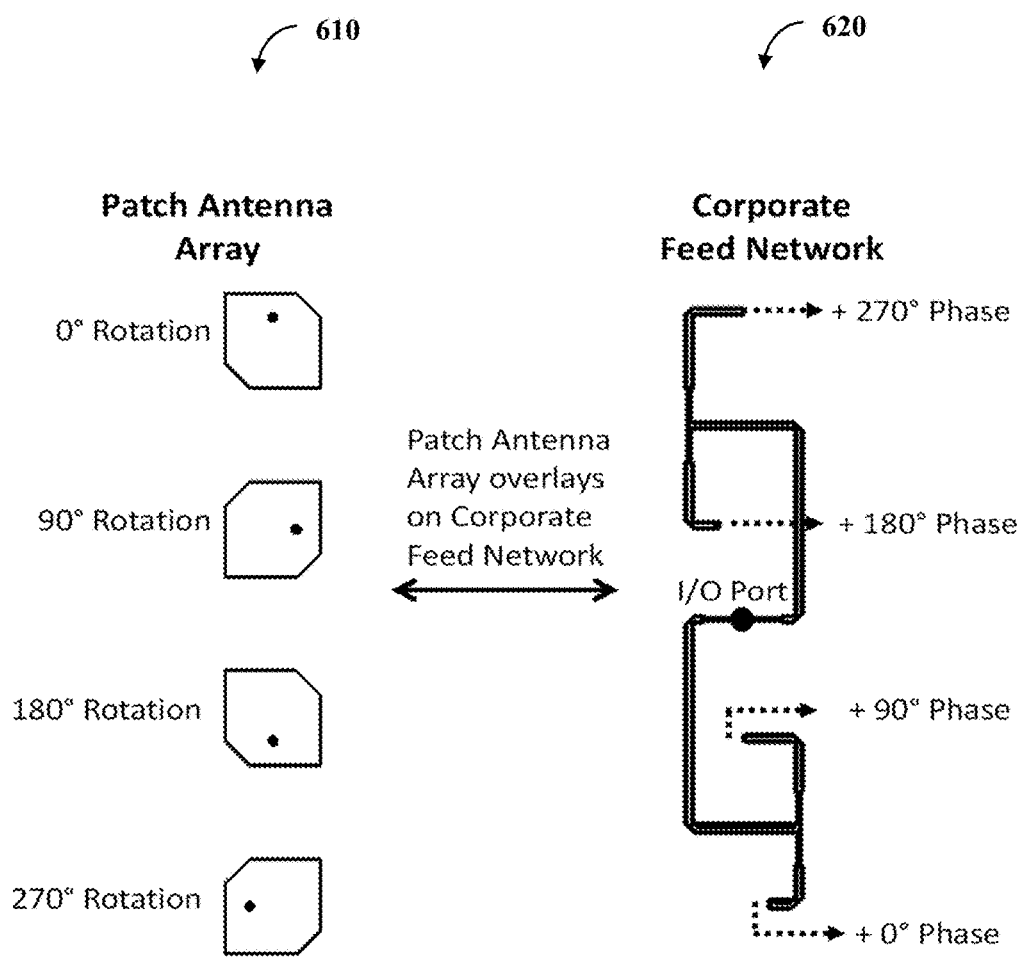
FIG. 6 illustrates one embodiment of a patch antenna array and a cooperate feed network.

FIG. 6 illustrates one embodiment of a patch antenna array 610 and a corporate feed network 620. The patch antenna array 610 can be powered by the corporate feed network 620. The corporate feed network 620 can power the individual elements of the patch antenna array 610 in such a way that the results of the plot 520 of FIG. 5 are achieved.

In one embodiment, the power supplied to the individual elements of the patch antenna array 610 can be in a form of a sine wave with at any one time the sine wave being able to be represented as a vector. The individual sine waves can be supplied to the elements in such a manner that peaks (e.g., +180°) of each wave supplied to each element line up at the same time. This lining up can cause increased (e.g., maximum) co-polarization with decreased (e.g., minimum) cross-polarization.

The individual elements of the patch antenna array 610 can physically line up over supply wires of the corporate feed network 620. The holes of the individual elements can be so that the supply wires can pass through to excite the individual elements. The corporate feed network 620 can be provided the power that is ultimately provided to the supply wires by way of an I/O port. A combination of physical rotation of the individual elements of the patch antenna array 610 and staggered phase in powering through the corporate feed network 620 can be used to achieve increased co-polarization with decreased cross-polarization.

In one example, rotation of the individual elements can cause the individual elements to be out of phase with one another. The corporate feed network 620 can offset these phase differences such that the individual elements are in phase with one another and/or relative phase delays are equal to about zero. With this, increased co-polarization and decreased cross-polarization can occur without negative impact to beam pattern shape and direction. This can be done through physical manipulation of the individual elements and the corporate feed network 620.

Figure 7:
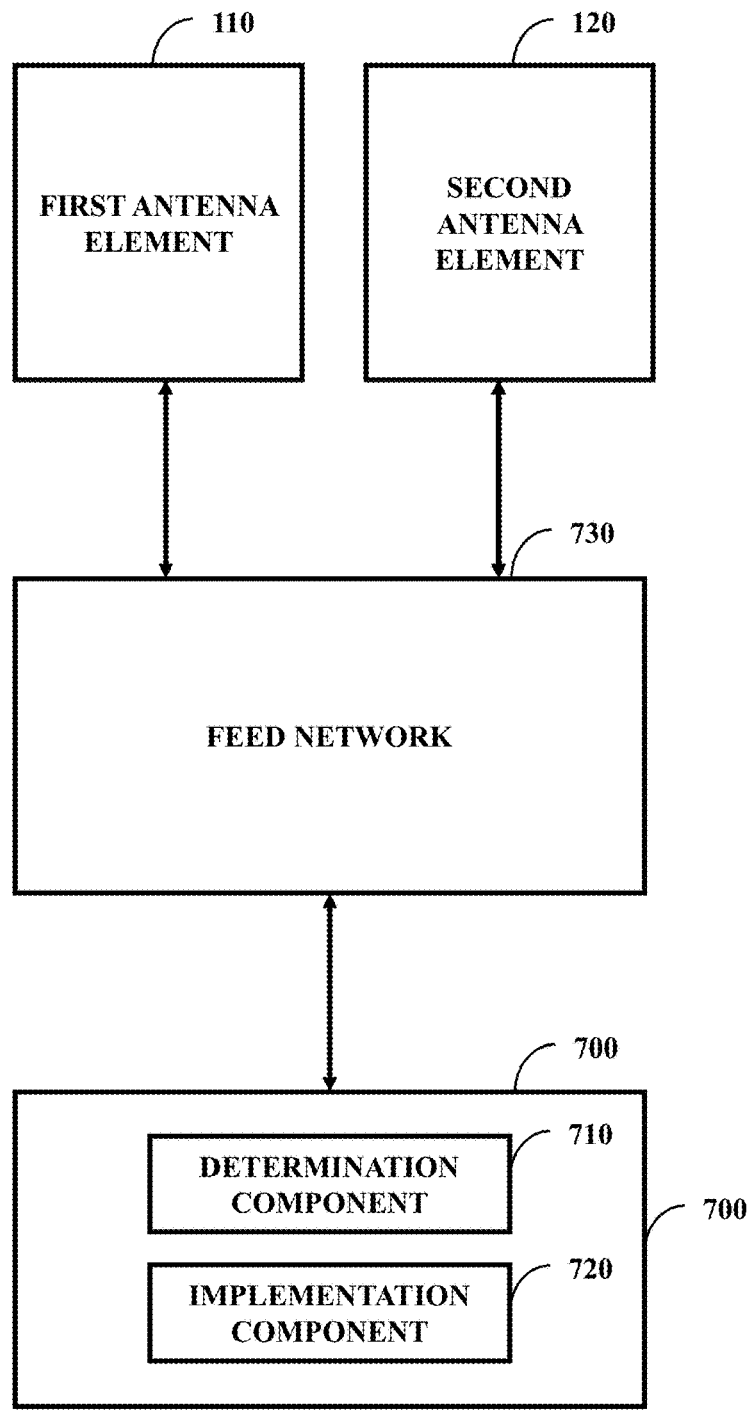
FIG. 7 illustrates one embodiment of a system comprising a determination component and an implementation component.

FIG. 7 illustrates one embodiment of a system 700 comprising a determination component 710 and an implementation component 720. The system 700 can connect to a feed network 730 (e.g., the corporate feed network 620 of FIG. 6). The first antenna element 110 can be powered with a first power by way of the feed network 730 and the second antenna element 120 can be powered with a second power by way of the feed network 730. The second power can be phase delayed from the first power and/or be of the same magnitude as the first power. The second power being phase delayed from the first power can cause production of the second electromagnetic vector in the first direction and cause production of the second electromagnetic vector in the second orthogonal direction. The second power being phase delayed can cause the experience of the co-polarization along the first electromagnetic directional axis and the cross-polarization along the second electromagnetic directional axis.

The determination component 710 can be configured to make a determination how to phase delay the second power from the first power and the implementation component 720 can be configured to cause the second power to be phase delayed from the first power. The determination can be based, at least in part, on a resultant increase in the co-polarization along the first electromagnetic axis and a resultant decrease in the cross-polarization along the second electromagnetic axis. The determination can be based, at least in part, on an increase in a co-polarization of the first electromagnetic vector in the first direction and the second electromagnetic vector in the second direction as well as a decrease in the cross-polarization of the first electromagnetic vector in the first orthogonal direction and the second electromagnetic vector in the second orthogonal direction.

In one embodiment, the first antenna element 110 and the second antenna element 120 can be physically mounted on the side of a vehicle. Initial physical mounting of the elements 110 and 120 can be such that maximum co-polarization and minimum cross-polarization are achieved with the same power (e.g., not phase delayed). However, as the vehicle moves over rough terrain, at least one of the two elements 110 and/or 120 can physically move. With this move, the maximum co-polarization with minimum cross-polarization may no longer be achieved. To return to maximum co-polarization with minimum cross-polarization how the elements are powered can be modified. The determination component 710 can evaluate the physical characteristics of the elements 110 and 120 and based on a result of this evaluation can determine how the elements 110 and 120 should be powered, such as determine a value of the phase delay between element 110 and element 120. The implementation component 720 can modify operation of the feed network 730 such that the elements 110 and 120 are powered in accordance with the determination.

While in the last paragraph physical movement of the elements 110 and/or 120 can occur, other alterations can take place. In one example, as the vehicle travels the power can be compromised such that the feed network 730 can no longer supply power as originally designed. Based on this the determination component 710 can determine that either correction of the feed network 730 should occur and/or physical rotation of the elements 110 and/or 120 should occur. The implementation component 720 can implement this determination, such as by rotation of at least one of the elements 110 or 120.

In one example, the system 700 can be a design system. The determination component 710 can determine how to initially configure the antenna elements 110 and 120. The implementation component 720 can be a machine that manufactures an antenna array comprising the elements 110 and 120 and/or transfer instructions to such a machine.

Figure 8:
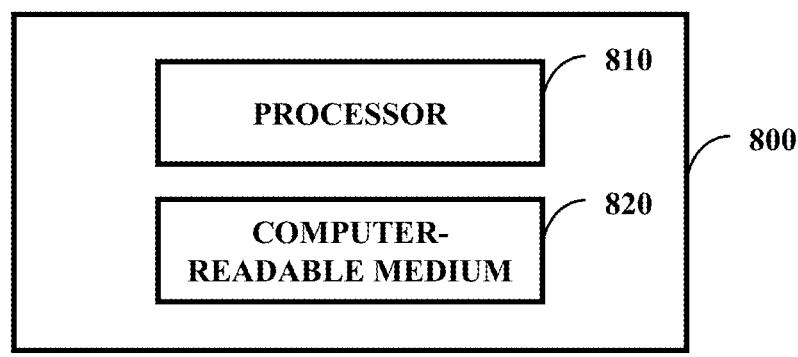
FIG. 8 illustrates one embodiment of a system comprising a processor and a computer-readable medium.

FIG. 8 illustrates one embodiment of a system 800 comprising a processor 810 (e.g., a general purpose processor or a processor specifically designed for performing functionality disclosed herein) and a computer-readable medium 820 (e.g., non-transitory computer-readable medium). In one embodiment, the computer-readable medium 820 is communicatively coupled to the processor 810 and stores a command set executable by the processor 810 to facilitate operation of at least one component disclosed herein (e.g., the determination component 710 of FIG. 7). In one embodiment, at least one component disclosed herein (e.g., the implementation component 720 of FIG. 7) can be implemented, at least in part, by way of non-software, such as implemented as hardware by way of the system 800. In one embodiment, the computer-readable medium 820 is configured to store processor-executable instructions that when executed by the processor 810 cause the processor 810 to perform a method disclosed herein (e.g., the methods 900-1200 addressed below).

Figure 9:
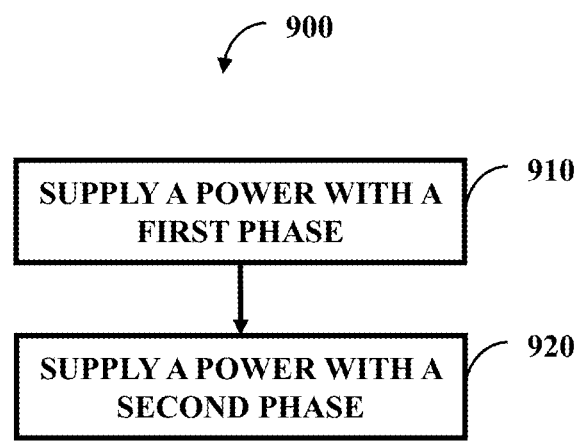
FIG. 9 illustrates one embodiment of a method comprising two actions.

FIG. 9 illustrates one embodiment of a method 900 comprising two actions 910-920. Actions 910 and 920 can be performed, at least in part, by a power component (e.g., the feed network 730 of FIG. 7) and the power component can be, at least in part, hardware. At 910 supplying a power with a first phase to the first antenna 110 of FIG. 1 can occur while at 920 supplying a power with a second phase to the second antenna 110 of FIG. 1 with the second phase being delayed with a phase delay from the first phase. In response to being supplied with the power with the first phase, the first antenna 110 of FIG. 1 emits a first electromagnetic vector (e.g., vector 210*a* of FIG. 3*a*) with component vectors (e.g., vectors 210*b* and 210*c* of FIG. 3*b*) in a first direction and a first orthogonal direction. In response to being supplied with the power with the second phase, the second antenna 120 of FIG. 2 emits a second electromagnetic vector (e.g., 310*a* of FIG. 3*a*) with component vectors (e.g., vectors 310*b* and 310*c* of FIG. 3*b*) in the first direction and a second orthogonal direction. The first orthogonal direction and the second orthogonal direction are opposite directions such that they, at least in part, cancel one another and the first electromagnetic component vector in the first direction and the second electromagnetic component vector in the first direction amplify magnitude in the first direction.

Figure 10:
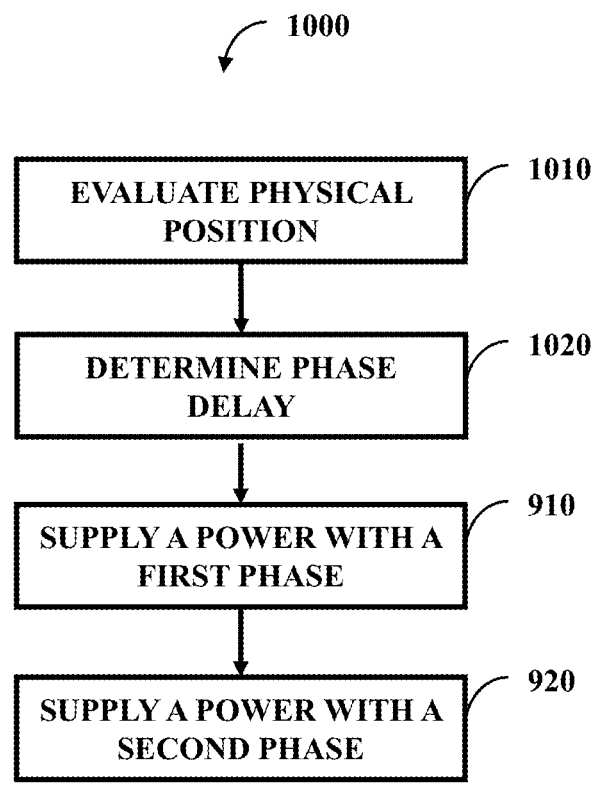
FIG. 10 illustrates one embodiment of a method comprising four actions.

FIG. 10 illustrates one embodiment of a method 1000 comprising four actions 1010-1020 and 910-920. At 1010, evaluating a physical position of the second antenna 120 of FIG. 1 relative to the first antenna 110 of FIG. 1 to produce an evaluation result can take place. This can include evaluating a physical position of the first antenna 110 of FIG. 1 relative to the second antenna 120 of FIG. 1 to produce the evaluation result. At 1020 determining the phase delay based, at least in part, on the evaluation result can take place. With the phase delay determined, power can be supplied in accordance with the phase delay at 910 and 920.

Figure 11:
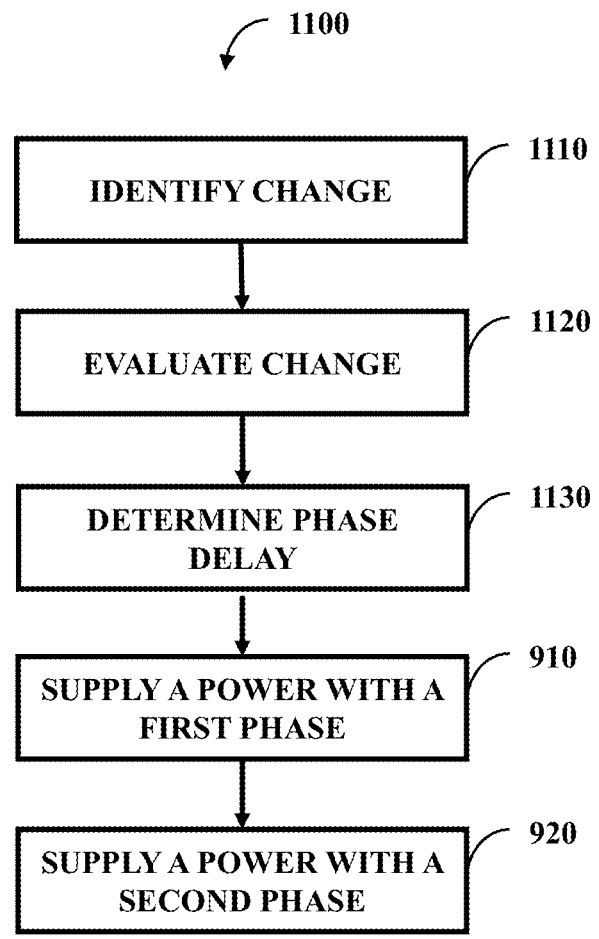
FIG. 11 illustrates one embodiment of a method comprising five actions.

FIG. 11 illustrates one embodiment of a method 1100 comprising five actions 1110-1130 and 910-920. At 1110, identifying a change in a physical position of the second antenna 120 of FIG. 1 relative to the first antenna 110 of FIG. 1 can occur. This change can be, for example, an intended change (e.g., a modification made from a technician), an unintended change (e.g. a modification from an antenna being hit with a rock), or a construction change (e.g., incorrect installation that deviates from an instruction guide). At 1120 evaluating the change in the physical position of the second antenna 120 of FIG. 1 relative to the first antenna 110 of FIG. 1 to produce an evaluation result in response to the change being identified can take place. At 1130, determining the phase delay based, at least in part, on the evaluation result can occur. With the phase delay determined, supplying of power with the phase delay can take place at 910 and 920.

Figure 12:
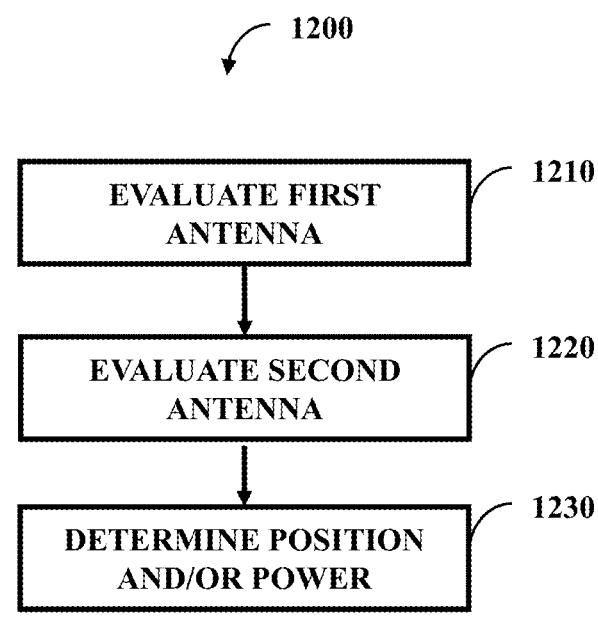
FIG. 12 illustrates one embodiment of a method comprising three actions.

FIG. 12 illustrates one embodiment of a method 1200 comprising three actions 1210-1230. At 1210, the first antenna 110 of FIG. 1 can be evaluated and at 1220, the second antenna 120 of FIG. 1 can be evaluated. The first antenna 110 of FIG. 1 and the second antenna 120 of FIG. 1 can be the same type of antenna or different antenna types with example antenna types including patch antenna or dipole antenna. At 1230, the position can be determined and/or the powering phase (e.g., phase delay) can be determined. Once determined, the position and/or powering phase can be implemented (e.g., the antenna array can be built according to the positioning and/or with the feed network 730 of FIG. 7 able to provide power with the phase delay). In one example, the phase delays can be caused by variable lengths from an I/O port for the feed network 730 of FIG. 7.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

Aspects disclosed herein can be used in various fields, including electromagnetics, radio frequency engineering, and antenna design. With these aspects, a strong co-polarization (e.g., circular polarization) can be achieved with low cross-polarization with a peak gain at bore site with different antenna types. As discussed above, antenna design can be of various types of antennas and these different types can be of various sizes, shapes, layering, and powering manners. As an example powering manner, individual antenna elements disclose herein can be powered with a wire probe that is offset from center.

What is claimed is:

1. A system comprising:
a first antenna element; and
a second antenna element,
where the first antenna element and the second antenna element experience a co-polarization along a first electromagnetic directional axis,
where the first antenna element and the second antenna element experience a cross-polarization along a second electromagnetic directional axis,
where the first electromagnetic directional axis is orthogonal to the second electromagnetic directional axis,
where the first antenna element is powered with a first power by way of a feed network,
where the second antenna element is powered with a second power by way of the feed network,
where the second power is phase delayed from the first power,
where the second power being phase delayed from the first power causes the experience of the co-polarization along the first electromagnetic directional axis, where the second power being phase delayed from the first power causes the experience of the cross-polarization along the second electromagnetic directional axis, where a determination is made on how to phase delay the second power from the first power; and where the determination is implemented to cause the second power to be phase delayed from the first power, where the determination is based, at least in part, on a resultant increase in the co-polarization along the first electromagnetic axis, and where the determination is based, at least in part, on a resultant decrease in the cross-polarization along the second electromagnetic axis.

2. The system of claim 1, where the co-polarization is right-hand circular polarization.

3. A system comprising:

a first antenna element; and a second antenna element, where the first antenna element and the second antenna element experience a co-polarization along a first electromagnetic directional axis, where the first antenna element and the second antenna element experience a cross-polarization along a second electromagnetic directional axis, and where the first electromagnetic directional axis is orthogonal to the second electromagnetic directional axis where the first antenna element is powered with a first power by way of a feed network, where the second antenna element is powered with a second power by way of the feed network, where the second power is phase delayed from the first power, where the second power being phase delayed from the first power causes the experience of the co-polarization along the first electromagnetic directional axis, and where the second power being phase delayed from the first power causes the experience of the cross- polarization along the second electromagnetic directional axis, where the first antenna is configured in a first physical orientation, where the second antenna is configured in a second physical orientation, where the first physical orientation and the second physical orientation cause the first antenna to be out of phase with the second antenna, and where the phase delay compensates the second antenna such that the first antenna and the second antenna are in phase to cause the co-polarization to be along the first electromagnetic directional axis.

4. The system of claim 3, where the co-polarization is left-hand circular polarization.

5. A system comprising:

a first antenna element; and a second antenna element, where the first antenna element and the second antenna element experience a co-polarization along a first electromagnetic directional axis, where the first antenna element and the second antenna element experience a cross-polarization along a second electromagnetic directional axis, where the first electromagnetic directional axis is orthogonal to the second electromagnetic directional axis, where the first antenna element is powered with a first power by way of a feed network, where the second antenna element is powered with a second power by way of the feed network, where the second power is phase delayed from the first power, where the second power being phase delayed from the first power causes the experience of the co-polarization along the first electromagnetic directional axis, and where the second power being phase delayed from the first power causes the experience of the cross-polarization along the second electromagnetic directional axis, where the first antenna and the second antenna are orientated against one another in an orientation scheme such that the first antenna is rotated to a first position and the second antenna is rotated to a second position, where the first position and the second position are different positions, where the orientation scheme causes the experience of the co-polarization along the first electromagnetic directional axis, and where the orientation scheme causes the experience of the cross-polarization along the second electromagnetic directional axis.

6. The system of claim 5, where the co-polarization is horizontal polarization.

7. A system comprising:

a first antenna element; and a second antenna element, where the first antenna element and the second antenna element experience a co-polarization along a first electromagnetic directional axis, where the first antenna element and the second antenna element experience a cross-polarization along a second electromagnetic directional axis, and where the first electromagnetic directional axis is orthogonal to the second electromagnetic directional axis where the first antenna element is powered with a first power by way of a feed network, where the first antenna element and the second antenna element are physically orientated against one another to experience co-polarization along the first electromagnetic directional axis and where the first antenna element and the second antenna element are physically orientated against one another to experience cross-polarization along the second electromagnetic directional axis.

8. The system of claim 7, where the co-polarization is vertical polarization.

9. The system of claim 7, where the co-polarization is horizontal polarization.

10. The system of claim 7, where the co-polarization is circular polarization.

11. A system, comprising:

a first antenna element; and a second antenna element, where the first antenna element, when powered, produces a first electromagnetic vector in a first direction, where the first antenna element, when powered, produces a second electromagnetic vector in a first orthogonal direction, where the second antenna element, when powered, produces a third electromagnetic vector in the first direction, where the second antenna element, when powered, produces a fourth electromagnetic vector in a second orthogonal direction, where the first orthogonal direction and the second orthogonal direction are opposite one another, where the first orthogonal direction is orthogonal to the first direction, and where the second orthogonal direction is orthogonal to the first direction.

12. The system of claim 11, comprising:
a feed network configured to power the first antenna element with a first power and configured to power the second antenna element with a second power,
where the second power is phase delayed from the first power,
where the second power being phase delayed from the first power causes production of the second electromagnetic vector in the first direction, and
where the second power being phase delayed from the first power causes production of the second electromagnetic vector in the second orthogonal direction.

13. The system of claim 12, comprising:
a determination component configured to make a determination how to phase delay the second power from the first power; and
an implementation component configured to cause the second power to be phase delayed from the first power,
where the determination is based, at least in part, on an increase in a co-polarization of the first electromagnetic vector in the first direction and the third electromagnetic vector in the second direction and
where the determination is based, at least in part, on a decrease in the cross-polarization of the second electromagnetic vector in the first orthogonal direction and the fourth electromagnetic vector in the second orthogonal direction.

14. The system of claim 11,
where the first antenna element and the second antenna element are physically orientated against one another such that when powered the first antenna element produces the first electromagnetic vector in the first direction,
where the first antenna element and the second antenna element are physically orientated against one another such that when powered the first antenna element produces the second electromagnetic vector in the first orthogonal direction,
where the first antenna element and the second antenna element are physically orientated against one another such that when powered the second antenna element produces the third electromagnetic vector in the first direction, and
where the first antenna element and the second antenna element are physically orientated against one another such that when powered the second antenna element produces the fourth electromagnetic vector in the second orthogonal direction.

15. The system of claim 11,
where the second antenna element produces the third electromagnetic vector in the first direction and produces the fourth electromagnetic vector in the second orthogonal horizontal direction due, in part, to physical orientation of the second antenna against a physical orientation of the first antenna and
where the second antenna element produces the third electromagnetic vector in the first direction and produces the fourth electromagnetic vector in the second orthogonal direction due, in part, to a phase delay of a power to the second antenna against a power to the first antenna.

16. A method, comprising:
supplying, by way of a power supply component that is, at least in part, hardware, a power with a first phase to a first antenna;
supplying, by way of the power supply component, a power with a second phase to a second antenna,
where the first antenna and the second antenna are part of an antenna array,
where the second phase is delayed with a phase delay from the first phase,
where, in response to being supplied with the power with the first phase, the first antenna emits a first electromagnetic vector with component vectors in a first direction and a first orthogonal direction, and
where, in response to being supplied with the power with the second phase, the second antenna emits a second electromagnetic vector with component vectors in the first direction and a second orthogonal direction,
where the first orthogonal direction and the second orthogonal direction are opposite directions such that they, at least in part, cancel one another, and
where the first electromagnetic component vector in the first direction and the second electromagnetic component vector in the first direction amplify magnitude in the first direction.

17. The method of claim 16,
where the first antenna is configured in a first physical orientation,
where the second antenna is configured in a second physical orientation,
where the first orientation and the second orientation cause the first antenna to be out of phase with the second antenna, and
where the phase delay compensates the second antenna such that the first antenna and the second antenna are in phase.

18. The method of claim 16, comprising:
evaluating a physical position of the second antenna relative to the first antenna to produce an evaluation result; and
determining the phase delay based, at least in part, on the evaluation result.

19. The method of claim 16, comprising:
identifying a change in a physical position of the second antenna relative to the first antenna;
evaluating the change in the physical position of the second antenna relative to the first antenna to produce an evaluation result in response to the change being identified; and
determining the phase delay based, at least in part, on the evaluation result.

20. The method of claim 16,
where the antenna array is a sub-array and
where the first direction is a bore site direction.

* * * * *